: 2,989,416
Patented June 20, 1961

2,989,416
WERNER COMPLEXES OF ORTHOHYDROXYL SUBSTITUTED BENZOPHENONE
William L. Standish, Atlanta, Ga., assignor to E. I. du Pont de Nemours and Company, Wilmington, Del., a corporation of Delaware
No Drawing. Filed Jan. 6, 1958, Ser. No. 707,127
13 Claims. (Cl. 117—33.3)

This invention relates to compositions absorptive of ultraviolet radiations, and processes for producing such compositions, to processes employing these compositions by treating articles with such compositions, and to the articles so treated. More particularly, the invention relates to water-soluble Werner complexes in which trivalent nuclear metal atoms are coordinated with ortho-hydroxyl substituted benzophenones.

Benzophenones and substituted benzophenones are known to be ultraviolet light absorbers. However, these materials possess certain disadvantages in being relatively inefficient in absorbing ultraviolet radiations of longer wave lengths, in being relatively insoluble in water, relatively difficult to apply to surfaces, or too readily washable from the products to which they are applied.

We have now found that by reacting certain ortho-hydroxyl substituted benzophenones, defined more fully hereinafter, with a trivalent metal compound wherein the metal is selected from the group consisting of chromium and aluminum, there is obtained a class of novel Werner complex compounds which have ability to absorb strongly the longer wave length ultraviolet portion of the spectrum. These water-soluble metal complexes are easily applied to a host of substrates including light-sensitive funicular and pellicular structures as well as transparent structures containing light-sensitive materials, particularly organic products. Furthermore, these metal complexes have the ability to become anchored to the substrate.

The novel compositions of this invention therefore comprise a water-soluble Werner complex compound in which a trivalent nuclear metal atom, said metal selected from the group consisting of chromium and aluminum, is coordinated with an ortho-hydroxyl substituted benzophenone having the formula:

(1)

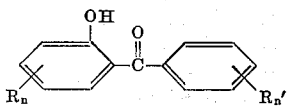

wherein the R radicals can be the same or different and are members of the group consisting of $NO_2$, OH, $NH_2$, Cl, Br, H, $CH_3$, $(CH_2)_xCH_3$, $OCH_3$, $O(CH_2)_xCH_3$, and —$CH=CH_2$ wherein $x$ is a cardinal number of up through 3; $n$ is a cardinal number of up through 2; and $n'$ is a cardinal number of up through 3. The $NO_2$, OH, and $OCH_3$ groups are preferred. 1 and 2 are the preferred values for $n'$. The solubility in water of these uncomplexed benzophenones is low, on the order of less than ½% at 20° C.

According to this invention, the novel benzophenone metal complexes of this invention can be made by effecting contact, in a substantially water-free system, between an ionizable low molecular weight basic salt of the metal and the selected benzophenone. It is necessary only that the reaction medium be such that each of the reacting compounds are soluble in it. Suitable solvents include ethanol, isopropanol, normal propanol, isobutanol, normal butanol, chloroform, etc.

The reaction temperture is not critical within a broad range. For example, the reaction can be carried out at room temperature, under which condition it will be essentially complete after 24 hours. The reaction proceeds more rapidly at elevated temperatures, proceeding to completion in less than two hours at 50° C., and less than thirty minutes at 80° C. Temperatures within the range of 25° to 100° C. are suitable, and the preferred range is 45° to 80° C.

The basic salts of the chromium and aluminum metals, from which the complex compounds of this invention can be made, are known. The method of preparing such salts is not critical. The procedure claimed in U.S. Patent 2,683,516 is preferred, but any of a variety of methods can be employed that reduce chromyl chloride ($CrO_2Cl_2$) to basic chromic chloride ($CrOCl_2$).

The ultraviolet radiation absorbing compositions are complex compounds of the Werner type. According to the Werner theory, atoms can exert auxiliary valences as well as the principal valences occurring in simple compounds. These auxiliary valences can act to hold various groups to the atom exerting them, and the atom exerting the principal and auxiliary valences may become the nuclear atom of a complex compound or complex ion.

With particular reference to chromium and to aluminum, it has been found for each of these metals that the total number of groups which can be held within the complex by the combined principal and auxiliary valences is six. The groups so held are referred to as "coordinated groups" and chromium is said to have a "coordination number" of six. Other groups can also be associated with the chromium or aluminum, but when this is the case such additional groups are present as ions and are outside of the metal-nuclear complex. Moreover, there can be more than one metal-nuclear atom within the complex, the metal atoms being linked together by reason of being coordinated through common groups known as bridging groups. With respect to each metal atom, each bridging group occupies but a single coordination position so that an additional five coordination groups can be present on the atom.

In accordance with the above-stated Werner theory, the composition of my invention can be described as Werner complex compounds characterized by having therein associated with a trivalent nuclear metal atom, said metal selected from the group consisting of chromium and aluminum, an ortho-hydroxyl substituted benzophenone having a structure of Formula 1 above. The metal atoms are "coordinated" with the hydroxyl groups of the substituted benzophenones.

The mole ratio of metal to benzophenone in the complexes of this invention can vary from 0.5:1 to 10:1, preferably in the range from 1:1 to 5:1.

The complex composition according to this invention can be utilized either in organic or aqueous solutions. The organic solutions can be prepared directly or by dissolving the complex in the desired solvent, which is preferably an alcohol. The aqueous solutions of the complex can best be prepared by admixing an alcoholic solution of the complex with water with agitation. Clear transparent aqueous solutions of the complexes can be prepared having a wide range of concentrations as high as 20% or more solids content. Aqueous solutions of the complexes have preferably a solids concentration ranging up to 5%. One or more complexes, with or without other materials, which can have the same or different functions, can of course be used in the same complex composition.

Any of a wide variety of materials can be afforded a great measure of protection against degradation caused by ultraviolet light by treatment with the novel ultraviolet screening complex compositions of this invention. These materials can be polymers such as for instance polyamides, polyesters, polyacrylonitrile, polyethylene, vinyl chloride, vinylidene chloride and copolymers thereof, polyvinyl fluoride; natural and synthetic rubber; cellulosic materials such as paper and protein polymers, in the form of solid articles, films, monofilaments, fibers, coatings, adhesives, and the like; rosin; dyes which fade under ultraviolet light and objects dyed therewith, including textile, more particularly rugs, curtains and awnings; and enclosures for ultraviolet sensitive materials such as cellophane for perishable food stuffs, polyvinyl fluoride, glass windows and wrappers for clothing, etc.

Ease of application to surfaces to be treated is one important advantage of this invention. That the complexes exhibit a tendency to anchor firmly to such surfaces is another important advantage.

The medium in which the complex is applied to a surface will depend greatly on the nature of the article being treated. For example, synthetic fibers such as rayon can be safely treated with an aqueous solution of the complex; however, treatment from organic systems might damage the fiber structure. It should be noted that the uncomplexed benzophenones are applicable only from organic media or as solids or melts.

It will be understood that the ultraviolet screening compositions of this invention can be applied to materials such as those mentioned above by any of a variety of methods. For instance, the chrome complex can be wiped or sprayed on the surface of the material to be treated. For treating films, fibers, etc., the complex is generally applied from an aqueous solution. Concentrations of 0.5% to 2.0% by weight complex are usually preferred for surface treatment. Drying periods of 3 to 5 minutes at 100 to 105° C. are usually sufficient to fix the complex to the treated surface. Application can be made by dripping, spraying, applicator roll, etc.

For maximum adherence, it is generally necessary to remove any surface films, oils, sizes and other deposits before treating with the complex. When applied to a substrate, as above, the complexes show good permanency toward dry cleaning and some permanency to mild soap washes. Where residual chlorides may be harmful, the surface can be washed free of chlorides after the drying step.

Another method of application is to dissolve the complex in a liquid coating material such as paint and then coat the article or articles to be protected using a modified coating composition. When it might be of value to incorporate the complex into polymers, a practical method is the inclusion in the polymer of fillers (silica, titanium dioxide, magnesium carbonate, diatomaceous earth, kaolin or the like) which have been treated with this complex. Direct addition to polymer solutions, preferably while in the melt, or dispersions can be employed in certain cases.

The amount of complex to use in the practice of this method of applying the complex to a surface varies over a broad range, depending on the concentration of the complex, the complex itself and the material to be protected. Broadly speaking, the treating solution should contain sufficient amount of the complex so that the treated material retains from 0.0001% to 20% of the metal complex.

The pH of dilute aqueous solutions of the complexes of this invention which are relatively acidic and where it is necessary to reduce acidity, as in treating materials subject to tendering, can be adjusted to a desired pH, say for example, a final pH of about 4.0–5.0, with dilute ammonia (1%).

The pH of the treating solution for application to surfaces will vary depending on the complex and the materials to be treated. In some cases, no neutralization is preferred and in other cases, pH adjustment is desired. The pH can be adjusted by the addition of $NH_3$; amines such as piperidine, morpholine, methyl amine, dimethylamine, trimethylamine, ethanolamine, pyridine, etc.; dicyandiamide; inorganic bases such as sodium formate, sodium carbonate, sodium bicarbonate, sodium silicate, sodium hydroxide, etc.; and quaternary ammonium hydroxides such as tetramethyl ammonium hydroxide. If a substantially chloride-free treating solution is desired, anionic exchange resins (weak or strong) can be used to adjust the pH.

In order to better understand this invention, reference should be had to the following illustrative examples. In each example the chromium or aluminum complex respectively is prepared in a three-neck round bottom flask, which is equipped with a reflux condenser, a stirrer, and a thermometer. Heat is applied, as indicated, by an electric mantle. After the complexes are prepared, they are cooled to room temperature by allowing to stand with no external cooling. Placing the flask containing the complex in a suitable ice bath would be an alternate method for obtaining cooling.

EXAMPLES 1 THROUGH 5

The following five examples illustrate the preparation of chromium complexes and aluminum complexes of the indicated benzophenones:

*Example 1.—Chromium complex of 2,4-dihydroxybenzophenone*

To 6 parts by weight of basic chromic chloride (8% Cr, 5% $H_2O$), 1 part by weight 2,4-dihydroxybenzophenone and 1 part by weight of distilled water are added. The mixture is heated to reflux. After refluxing for 20 minutes, the solution is cooled to room temperature. The complex contains 6% Cr and has a chromium: benzophenone mole ratio of 2:1. One gram of this resultant complex is admixed with additional distilled water to form a dilute solution having a concentration of $5 \times 10^{-3}$ grams of benzophenone per liter of solution.

*Example 2.—Chromium complex of 2,4-dihydroxybenzophenone*

Two parts by weight of the chromium complex prepared as in Example 1 (before dilution) are admixed with isopropanol to form a dilute solution having a concentration of $5 \times 10^{-3}$ grams of benzophenone per liter of solution.

*Example 3.—Aluminum complex of 2,4-dihydroxybenzophenone*

To 35 parts by weight of acidified isopropyl alcohol, 35 parts by weight of 50% isobutanol solution of aluminum isopropoxide and 10 parts 2,4-dihydroxybenzophenone are added. The mixture is heated to 50° C. for one hour and cooled. The resultant aluminum complex contains 3% Al and has an aluminum:benzophenone mole ratio of 2:1. One gram of this aluminum complex is admixed under good agitation with 24 liters of distilled water to form a dilute solution.

*Example 4.—Aluminum complex of 2,4-dihydroxybenzophenone*

One gram of the aluminum complex of 2,4-dihydroxybenzophenone prepared as in Example 3 (before dilution) is admixed with 24 liters of isopropanol to form a dilute solution.

*Example 5.—Chromium complex of 2,2',4,4'-tetrahydroxybenzophenone*

To 66 parts by weight of basic chromic chloride (8% chromium, 5% $H_2O$), 12.5 parts of 2,2',4,4'-tetrahydroxybenzophenone and 10 parts of water are added. The mixture is heated to reflux. After refluxing for 25 minutes, the solution is cooled to room temperature. The resulting chromium complex contains 6% chromium and has a chromium:benzophenone mole ratio of 2:1. One gram of the chromium complex according to this example is diluted with 2300 grams of isopropanol to form a dilute solution.

Each of the dilute solutions obtained in Examples 1 through 5 are evaluated using a Cary Recording Spectrophotometer Model 11M having a cell path adjusted to 1 centimeter. Evaluation of each dilute solution with the Cary Spectrophotometer shows the excellent absorption qualities of the complexes of these examples for ultraviolet light within the wave length range from 2300 to 4300 Angstroms.

Comparative test results can be shown between comparable isopropanol solutions of uncomplexed 2,4-dihydroxybenzophenone and isopropanol solutions of complexed 2,4-dihydroxybenzophenone to illustrate the unexpected difference in properties of the complexed benzophenone compared with those of the uncomplexed benzophenone. Comparative evaluation of the uncomplexed versus the complexed benzophenones could not be made in distilled water solutions since the uncomplexed benzophenone is insoluble in water. This immediately points up an outstanding advantage of the complexes of the present invention, since the complexes of the invention are water soluble and can be applied to surfaces from water solution.

Comparative evaluation also points up another significant difference and advantage in the chromium complexes, namely, that the absorption peaks of the complexes are closer by a significant amount to the visible wave length range than the corresponding peaks of the uncomplexed benzophenones. In other words, the peaks have shifted markedly, indicating higher absorption by the complexes in the longer wave length range. This shift is accompanied by an increased area under the absorption curve, as will be appreciated by persons in the art.

EXAMPLE 6

*Aluminum complex of 2,2',4,4'-tetrahydroxybenzophenone*

To 3 parts by weight of acidified isopropanol, 3 parts by weight of a 53% isobutanol solution of aluminum isopropoxide and 1 part by weight of 2,2',4,4'-tetrahydroxybenzophenone are added. The mixture is heated to 50° C. for one hour and then cooled to room temperature. The resulting aluminum complex contains 3% aluminum and has an aluminum:benzophenone mole ratio of 2:1. The complex has a deep red color.

Three parts of the aluminum complex according to this example are diluted with 97 parts of water. A sample of suede leather, previously dyed by spraying with a solution containing 3 ounces per gallon of "Pontachrome Brown G" dye (Color Index No. 238) in water, is treated by soaking in the dilute complex solution and dried. Upon exposure to ultraviolet light for as little as 24 hours, this leather sample fades to a much lesser extent than a comparably handled but untreated suede leather sample.

EXAMPLE 7

*Chromium complex of 2,2'-dihydroxy-4,4'-dimethoxybenzophenone*

To 29 parts by weight of basic chromic chloride (6.7% Cr, 23% $H_2O$), 10 parts by weight 2,2'-dihydroxy-4,4'-dimethoxybenzophenone are added. The mixture is heated to reflux. After refluxing for 15 minutes, the mixture is cooled to room temperature. The resulting complex contains 5% Cr, and has a chromium:benzophenone mole ratio of 2:1.

One part by weight of the chrome complex is diluted with twenty-one parts by weight of water. A sample of "Saran" (vinylchloride-vinylidine chloride copolymer) is treated by dipping into the dilute complex solution and then drying. The treated sample does not darken upon exposure to ultraviolet light for 30 days; in contrast, the untreated control sample becomes noticeably darker.

EXAMPLE 8

*Aluminum complex of 2,2'-dihydroxy-4,4'-dichlorobenzophenone*

To 30 grams of acidified ethyl alcohol, 7.2 grams of aluminum-isopropoxide and 10 grams of 2,2'-dihydroxy-4,4'-dichlorobenzophenone are added. The mixture is heated to about 55° C. for one hour and then cooled to room temperature. The resulting aluminum complex contains 2.5% aluminum and has an aluminum:benzophenone mole ratio of 1:1.

Four grams of the aluminum complex are diluted with six grams methyl alcohol and the mixture is then diluted with 8.8 grams of water. A sample of silk fabric is soaked in the dilute solution for 30 seconds and then dried at 100° C. The treated sample is then soaked in water for 30 seconds and dried again. After exposure to ultraviolet light (2300–4500 Angstroms) for 10 days, the treated sample retains considerably more of its original tensile strength than does an untreated sample.

EXAMPLE 9

*Chromium complex of 2-hydroxybenzophenone*

To 165 grams of basic chromic chloride (8% Cr, 5% $H_2O$), 10 grams of 2-hydroxybenzophenone and 45 grams of isopropanol are added. The mixture is heated to reflux, and after refluxing for 30 minutes, cooled to room temperature. The resulting chromium complex contains 6% Cr and has a chromium:benzophenone mole ratio of 5:1.

One hundred grams of the complex commodity are diluted with 900 grams of water. The solution is sprayed on one-half of a test panel which has a coating of a modified linseed oil base containing nigrosene (an organic black pigment). Upon exposure to ultraviolet light for 3 months, the sprayed half of the panel fades considerably less than the untreated half of the panel.

EXAMPLE 10

*Aluminum complex of 2-hydroxy-4,4'-dinitrobenzophenone*

To 37 parts by weight of acidified normal-propyl alcohol 21 parts by weight of powdered aluminum-isopropoxide, 10 parts by weight of 2-hydroxy-4,4'-dinitrobenzophenone, and 3 parts by weight of distilled water are added. The mixture is heated to 75° C. for 40 minutes and then cooled to room temperature. The resulting aluminum complex contains about 4% aluminum and has an aluminum:benzophenone mole ratio of 3:1.

Twenty grams of the aluminum complex are diluted with 40 grams of acetone and then diluted with 940 grams of water. A piece of cotton fabric is soaked in this solution for about 1 minute and is then dried at 105° C. The treated sample and an untreated control sample alongside are exposed to ultraviolet light for one week. At the end of this period, the untreated sample becomes yellow in color, while the treated sample remains unchanged in color.

EXAMPLE 11

*Chromium complex of 2,2'-dihydroxy-4,4'diaminobenzophenone*

To 58 grams of basic chromic chloride (7.2% Cr, 23% $H_2O$), 20 grams of 2,2'-dihydroxy-4,4'-diaminobenzophenone and 8 grams of water are added. The resulting solution is heated to 65° C. for one and one-half hours and then cooled to room temperature. The resulting chromium complex contains 5% Cr, and has a chromium:benzophenone mole ratio of 1:1.

Twenty grams of the chromium complex are diluted with 980 grams of water. A sample of wool is soaked in this dilute solution for about one minute and it is then dried at 100° C. in an air circulation oven. The treated sample and an untreated sample are exposed to an ultra-violet lamp for two weeks. The untreated, control sample loses appreciably more of its tensile strength than the treated sample.

EXAMPLE 12

*Aluminum complex of 2-hydroxy-4,4'-diethoxybenzophenone*

To 5.5 grams of acidified ethyl alcohol are added 1.5 grams aluminum ethoxide and 5 grams 2-hydroxy-4,4'-diethoxybenzophenone. The mixture is heated at 40° C. for three hours and then cooled to room temperature. The resulting aluminum complex contains 2% aluminum, and has an aluminum:benzophenone mole ratio of 1:2.

A wood test panel is coated with a typical tung oil base spar varnish containing phenol-formaldehyde resin. One half of the test panel is then painted with a solution containing 2 grams of the aluminum complex of this example, 4 grams ethanol and 94 grams of water. Upon exposure to an ultraviolet lamp, the treated half of the panel shows considerably less discoloration, fading, and delustering than does the untreated half.

EXAMPLE 13

*Aluminum complex of a commercially available mixture of 2,2',4,4'-tetrahydroxybenzophenone, 2,2'-dihydroxy-4,4'dimethoxybenzophenone, and 2,4-dihydroxybenzophenone (known as "Uvinul–490")*

To 49 grams of acidified isopropanol, 15 grams of the just-mentioned commercially available mixture of substituted benzophenones and 43 grams of 55% isobutanol solution of aluminum isopropoxide are added. The mixture is heated for 80 minutes at 50° C. and cooled to room temperature. The resulting aluminum complex contains 2.9% aluminum and has a greenish color.

Samples of 0.005" thick cellophane film are dipped into a solution containing 2 grams of the aluminum complex of this example, 2 grams methanol and 96 grams water, and dried at 110° C. for ten minutes. Potato chips wrapped in both treated and untreated cellophane tested after three months of exposure to sunlight show that the potato chips in the untreated cellophane are stale and those in the treated cellophane are still fresh.

EXAMPLE 14

*Chromium complex of 2-hydroxy-4,4'-dimethylbenzophenone*

To 9 parts by weight of basic chromic chloride (7.8% Cr, 4.5% $H_2O$), 1 part by weight of 2-hydroxy-4,4'-dimethylbenzophenone is added. The mixture is heated to reflux and after 15 minutes of reflux, cooled to room temperature. The resulting chromium complex contains 7% Cr, and has a chromium:benzophenone mole ratio of 3:1.

Twenty grams of the chromium complex is diluted with 900 grams of water, and the dilute complex solution sprayed onto a sample of "Velon" (vinyl chloride-vinylidine chloride copolymer) film and dried. Upon exposure to ultraviolet light for 30 days, the treated sample darkens very little, if any, while the untreated sample darkens considerably.

EXAMPLE 15

*Aluminum complex of 2,2'-dihydroxy-4,4'-dimethoxy-6,6'-dinitrobenzophenone*

To 40 grams of acidified isopropanol are added 10 grams 2,2'-dihydroxy-4,4'-dimethoxy - 6,6' - dinitrobenzophenone, 10 grams powdered aluminum isopropoxide, and 1 gram of water. The mixture is heated to 35° C. for ten hours. The resulting aluminum complex contains 2.5% aluminum and has an aluminum:benzophenone mole ratio of 2:1.

To 2 grams of the aluminum complex are added 100 grams of a commercially available varnish-mahogany stain mixture. This mixture is applied to a piece of wood by painting on with a brush. Another piece of the same wood is also painted with the same type varnish (no complex added). After exposing the two pieces of wood to sunlight for 60 days, it is noticed that the sample painted with the varnish-stain mixture not containing the complex fades much more than the other piece of wood which was painted with the same varnish but having the complex commodity included.

EXAMPLE 16

*Aluminum complex of 2-hydroxy-4,4'-divinylbenzophenone*

To four parts by weight of acidified isobutanol are added four parts by weight of a 52% isobutanol solution of aluminum isopropoxide and one part by weight of 2-hydroxy - 4,4' - divinylbenzophenone. The mixture is heated to 118° F. for 75 minutes and cooled to room temperature. The resulting aluminum complex contains 3% aluminum and has an aluminum:benzophenone mole ratio of 2.5:1.

One gram of this aluminum complex is diluted with two grams methanol and the mixture is added to 85 grams of "Genton 110" (a 10% aqueous dispersion of "Zytel–61" nylon resin). Films are cast from the above mixture by spreading 5 ml. over a 12 square inch glass plate; first, they are air dried, then cured at 70° C. for 30 minutes. Also, films are cast from the "Genton 110" emulsion not containing the complex. Samples of both type films are exposed to the ultraviolet light of a fadeometer for 40 days. The films not containing the complex become considerably more yellow than the films containing the complex.

It is of course necessary, in the process of applying the screening agents according to this invention to articles, that the screening agents and the articles being coated be compatible with each other. If such is not the case, the ultraviolet absorbing materials may erode or peel off the surface, and consequently provide no satisfactory protection.

Not only must the complex according to this invention be compatible with the surface being treated, but it is also of course necessary that the medium carrying the complex according to this invention be compatible with the surface to which the complex is being applied, in order that no damage to the surface or to the article being coated shall occur as a result of the treatment. For example, partial degradation of rayon and other synthetic fibers can be caused by organic solvents such as acetone, and it is therefore necessary to avoid the use of certain solvents for certain applications. The selection of the particular carrying medium or solvent to be used under particular conditions, in applying the complexes of this invention to a particular surface or article, will depend broadly on the compatible nature of the materials involved. Incompatible combinations of materials can readily be avoided by persons skilled in the art.

In general, the metal coordinated structure of the complexes of this invention provides good even bonding of the screening agent to the surface of the article or articles being treated. This is especially true if the surface being treated contains negatively charged polar groups such as, for example, OH, $NH_2$, etc. The bonding between the complex and the surface is believed to result from the action of both covalent and polar forces, thus providing very strong adhesion.

A particularly advantageous quality of the chromium complexes according to this invention lies in the shifting of the peaks of the absorption bands toward the visible range of wave lengths. It is highly desirable because protection can be provided by these complexes for articles which may be damaged considerably by the relatively long wave length ultraviolet (near 4000 Angstroms) where the uncomplexed benzophenones do not absorb.

The invention claimed is:
1. A water-soluble Werner complex compound in which a trivalent nuclear metal atom, said metal being selected from the group consisting of chromium and aluminum. is coordinated with an ortho-hydroxyl substituted benzophenone having the formula:

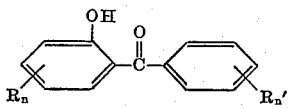

wherein the R radicals are from the group consisting of $NO_2$, OH, $NH_2$, Cl, Br, H, $CH_3$, $(CH_2)_xCH_3$, $OCH_3$, $O(CH_2)_xCH_3$, and $-CH=CH_2$ wherein $x$ is a cardinal number of up through 3; $n$ is a cardinal number of up through 2; and $n'$ is a cardinal number of up through 3.

2. A water-soluble Werner complex compound of claim 1 wherein the ratio of metal atoms to substituted benzophenone groups is less than about 10:1.

3. A water-soluble Werner complex compound of claim 1 wherein R is $NO_2$.

4. A water-soluble Werner complex compound of claim 1 wherein R is OH.

5. A water-soluble Werner complex compound of claim 1 wherein R is $OCH_3$.

6. A water-soluble Werner complex compound in which a trivalent nuclear chromium atom is coordinated with 2,4-dihydroxybenzophenone.

7. A water-soluble Werner complex compound in which a trivalent nuclear chromium atom is coordinated with 2,2',4,4'-tetrahydroxybenzophenone.

8. A water-soluble Werner complex compound in which a trivalent nuclear aluminum atom is coordinated with 2,4-hydroxybenzophenone.

9. A water-soluble Werner complex compound in which a trivalent nuclear aluminum atom is coordinated with 2,2',4,4'-tetrahydroxybenzophenone.

10. In a process for applying a surface coating of ultraviolet radiation absorbing material to an article, the step comprising effecting contact of said surface with a water-soluble Werner complex compound composition as set forth in claim 1.

11. In a process for providing protection for an article from degradation due to ultraviolet and visible radiation, the improvement comprising applying to the surface of said article to be protected the composition of claim 1 in a solution having a concentration from 0.5% to 2.0% by weight of said complex, and drying the applied coating.

12. An article protected from the harmful effects of ultraviolet radiations and characterized by the presence on its surface of an adherent coating of a composition of claim 1.

13. An article protected from the harmful effects of incident ultraviolet radiations and characterized by the presence on its surface of an adherent coating of a composition of claim 6.

References Cited in the file of this patent
UNITED STATES PATENTS

| | | |
|---|---|---|
| 2,544,667 | Goebel et al. | Mar. 13, 1951 |
| 2,614,940 | Freyermuth et al. | Oct. 21, 1952 |
| 2,693,492 | Hoch | Nov. 2, 1954 |
| 2,746,896 | Thompson | May 22, 1956 |
| 2,773,903 | Hardy et al. | Dec. 11, 1956 |
| 2,823,144 | Dalton | Feb. 11, 1958 |

OTHER REFERENCES

J. Chem. Soc., July 1954, page 2468.
Nature, November 5, 1949, page 789.